United States Patent

Head, III

[15] 3,705,416

[45] Dec. 5, 1972

[54] METHOD OF OPERATING A COMPUTER TO READ INFORMATION FROM CARDS

[72] Inventor: Claude D. Head, III, Dallas, Tex. 75240

[73] Assignee: Texas Instruments Inc.,

[22] Filed: Dec. 29, 1971

[21] Appl. No.: 213,618

[52] U.S. Cl.......................235/61.11 E, 250/219 DC

[51] Int. Cl............................G06k 7/10, E04g 17/00

[58] Field of Search..235/61.11 E, 61.11 D, 61.11 R; 250/219 DC

[56] References Cited

UNITED STATES PATENTS

| | | | |
|---|---|---|---|
| 3,184,581 | 5/1965 | Willoughby | 235/61.11 E |
| 3,238,357 | 3/1966 | Minka | 250/219 DC |
| 3,480,762 | 11/1969 | Del Vecchio | 235/61.11 E |
| 3,496,342 | 2/1970 | Milford | 235/61.11 E |
| 3,519,990 | 7/1970 | Holt et al. | 235/61.11 E |

*Primary Examiner*—Daryl W. Cook
*Attorney*—Harold Levine et al.

[57] ABSTRACT

A computer such as a bit-pusher computer is programmed to read information from cards such as punched cards. A plurality of card sensors are utilized to generate interrupt signals and thereby indicate to the computer each time the card is moved to a new position at which information is to be read and a second plurality of sensors reads the information from the cards at each position. In one embodiment, the computer is programmed to read Hollerith code where a plurality of digits or characters are read simultaneously one-code-line at a time as the card is moved across the position indicating sensors. The program also includes the generation of enabling signals for the next position sensor at which information is to be read from the card so that a card passing over a position sensor more than once will not affect the sequence of information being read from the cards.

16 Claims, 7 Drawing Figures

| | 6 | 5 | 4 | 3 | 2 | 1 |
|---|---|---|---|---|---|---|
| 0 | 0 | 0 | 0 | 0 | 0 | 0 |
| 1 | 1 | 0 | 0 | 0 | 0 | 0 |
| 2 | 0 | 0 | 0 | 0 | 0 | 0 |
| 3 | 0 | 0 | 0 | 0 | 0 | 0 |
| 4 | 0 | 1 | 0 | 0 | 0 | 0 |
| 5 | 0 | 0 | 0 | 1 | 0 | 0 |
| 6 | 0 | 0 | 0 | 0 | 0 | 0 |
| 7 | 0 | 0 | 1 | 0 | 0 | 1 |
| 8 | 0 | 0 | 0 | 0 | 0 | 0 |
| 9 | 0 | 0 | 0 | 0 | 1 | 0 |

METHOD OF OPERATING A COMPUTER TO READ INFORMATION FROM CARDS

This invention relates to card reader systems and more particularly to a method of controlling a dynamic position-actuated card reader system utilizing a digital computer.

It is an object of the present invention to provide a method of operating a digital computer to provide an improved card reader system for reading data cards, credit cards, security badges and the like.

It is another object of the invention to provide a card reader system which is activated by a digital computer to read lines of information recorded on a card as the card is dynamically moved through the card reader.

It is a feature of the invention that the particular lines of code which are read by the card reader are selectively activated by the digital computer in response to the dynamic movement of the card through the card reader.

These and other objects and features are accomplished in accordance with the present invention by programming a computer such as a bit-processor computer in conjunction with a card reader to read information from cards such as punched cards. The card reader includes a first plurality of sensors positioned in a row for sensing the position of a card moved dynamically across such sensors and a second plurality of sensors positioned in a row preferably substantially perpendicular to the row of position sensors for reading information from the card. The position sensors are utilized to generate interrupt signals and thereby indicate to the computer each time the card is moved to a new position at which information is to be read from the card by the second plurality of sensors. As the card is dynamically moved across the position sensors in the first row, a counter in the computer is programmed to keep track of the code line being read by the second row of sensors as a function of the position of the card in relation to the first row of sensors. Only one sensor in the first row is enabled at a time by a plurality of logic gates in conjunction with the programmed counter in the computer from which the computer generates enabling signals so that only one corresponding line of code is read as the card moves across the enabled sensor. If the card is moved backwards across a sensor which has already been enabled, no information is read from the card; it is only when the card is dynamically moved across the enabled sensor that a line of information is read and then immediately thereafter, the programmed counter in the computer and the logic gates enable the next sensor in the first row in order for the next code-line to be read by the sensors in the second row as the card is moved across such next sensor. Additional sensors may be provided to determine whether the card is upside down in conjunction with a programmed comparison step and logic flag in the computer. The computer memory is utilized to store the information as it is read from the cards.

In one embodiment, the computer is programmed to read hollerith code where a plurality of digits or characters are read simultaneously one-code-line at a time as the card is moved across the position indicating sensors. The program also includes a plurality of steps for converting the hollerith code to binary code.

Still further objects, features and advantages of the invention are apparent from the detailed description and claims and from the accompanying drawings wherein:

Figure 3:
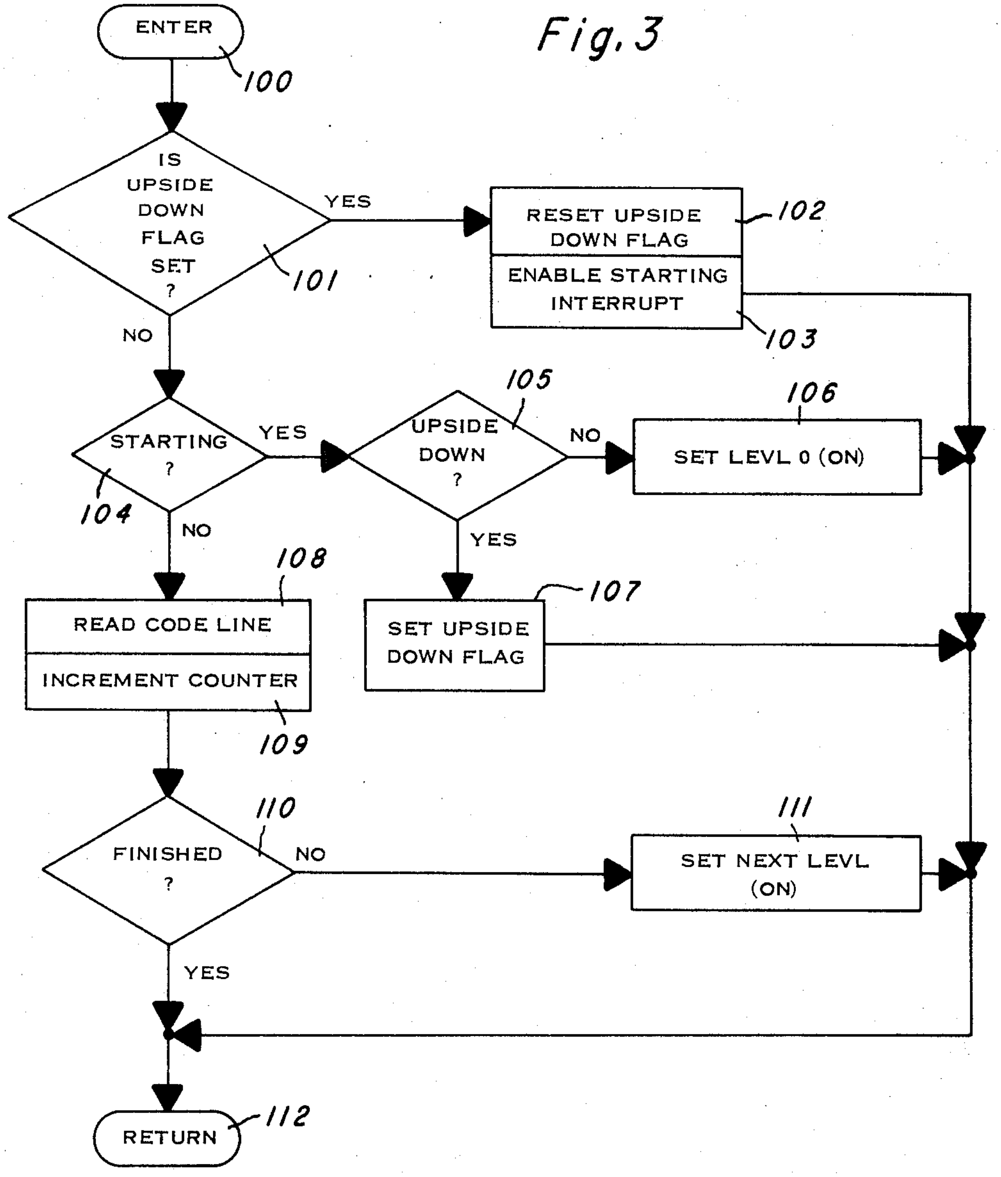
FIG. 3 is a flow diagram illustrating an embodiment of the method of the present invention utilized in the operation of the system of FIG. 2.

Table I contains a MODE 1 interrupt level program for a 2,540 bit-pusher computer corresponding to the flow chart of FIG. 3.

Figure 1:
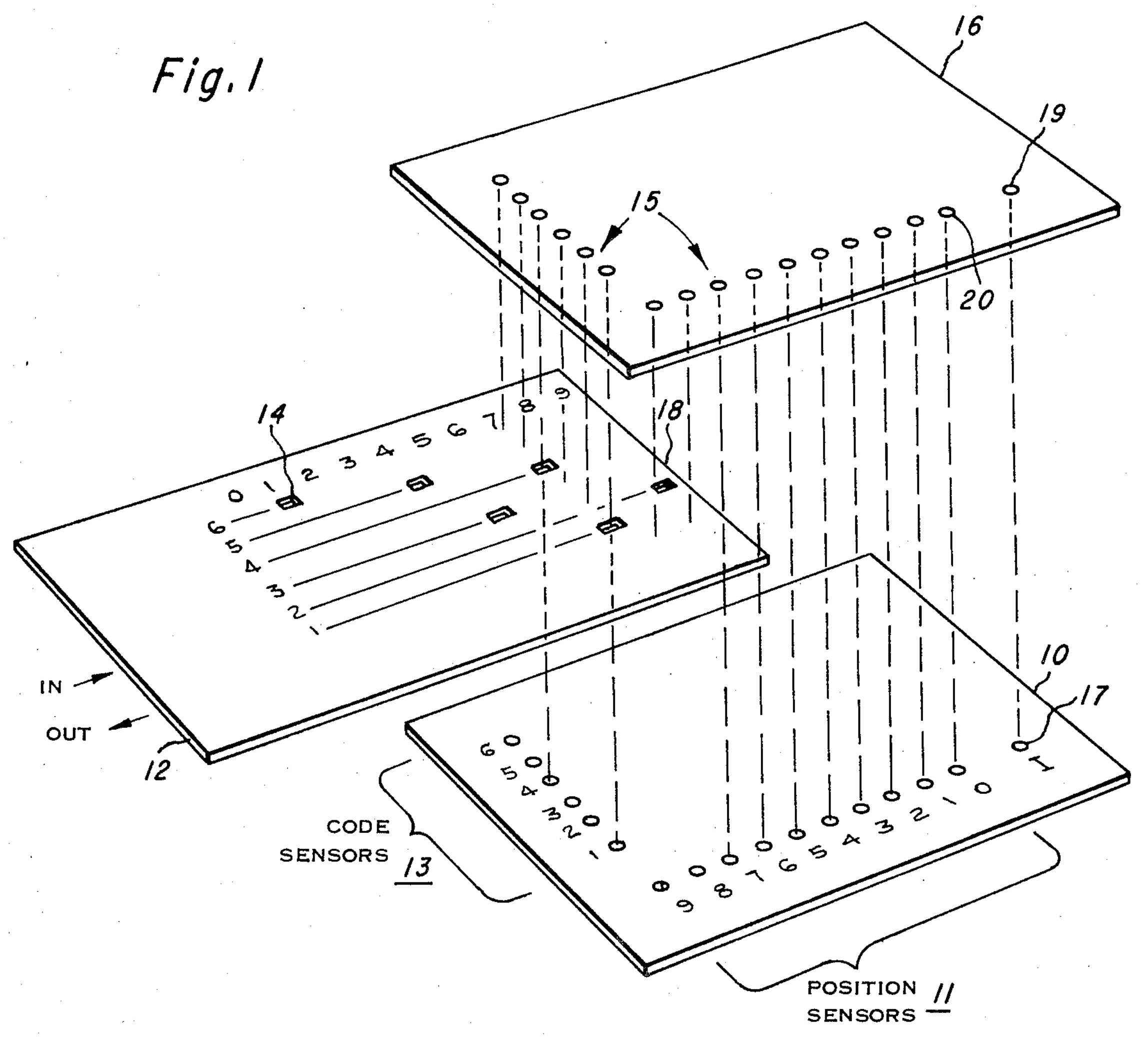
FIG. 1 is an isometric view of a coded card as it is dynamically drawn across the card reader sensors of a card reader system according to an embodiment of the invention.

Referring to the drawings, a card reader utilized in conjunction with the method of the present invention to provide a card reader system is illustrated in FIG. 1. The card reader is comprised of a substrate 10 having a first plurality of position sensors 11 aligned in a row for sensing the position of a card 12 moved dynamically across sensors 11 having a second plurality of sensors 13 positioned in a row preferably perpendicular to the row of position sensors 11 for reading information recorded on card 12.

In the illustrated embodiment, information is recorded on card 12 in the form of punched holes 14 selectively positioned on card 12. Accordingly, the sensors 11 and 13 are shown in the present embodiment as photodetectors which are responsive to corresponding respective light emitters 15 positioned in a corresponding pattern on substrate 16.

Card 12 is read as follows. Initially, only the I sensor 17 is enabled by a signal generated from a bit-register in the computer. As card 12 is inserted into the card reader between substrates 10 and 16 in the IN direction, edge 18 of card 12 passes over sensor 17 and blocks the light generated by a corresponding light emitter 19 from sensor 17 thereby deactivating sensor 17. This provides an interrupt signal for the computer which causes the computer to make a pass through the program. During the first pass through the program, all conditions being appropriately set, the computer generates an enable signal which, in conjunction with a plurality of external logic gates, enables the numbered O position sensor. As the card is withdrawn from the card reader in the OUT direction, the O position sensor remains dark until edge 18 of card 12 passes over the O position sensor allowing the light generated by a corresponding light emitter 20 to activate the O position sensor. When the O position sensor has been activated, an interrupt signal is transmitted from the logic gates to the computer, the O line of code is read from card 12 by sensors 13 which is also transmitted to the computer, and an enable signal is then generated by the computer for the next position sensor in the row of position sensors.

In the illustrated embodiment, the card 12 is shown to contain six digits of recorded information in six rows, 1–6, represented by a hole along one of 10 code-lines 0–9, which is typically referred to as a six-digit Hallerith code. In the illustrated embodiment, all six digits are read simultaneously one code-line at a time. As shown in FIG. 1, card 12 is in a position such that edge 18 of card 12 has passed over the numbered 7 position sensor and code-line 7 is being read by sensors 13. There are two holes in code-line 7 in the first and fourth rows which is indicative of the numeral 7 in the first and fourth digit positions of the six-digit number, for example.

As only the numbered 7 position sensor is enabled when code-line 7 is to be read, reinserting the card into the card reader in the IN direction does not affect the reading sequence. This is the result of a counting register in the computer which is counting in sequence each time an interrupt signal is generated by one of the position sensors to the computer and a pass is made through the program so that a code-line is read, and the computer in conjunction with the logic gates enables only the position sensor for the next line of code to be read when the previous line of code has been read and stored.

Figure 2:
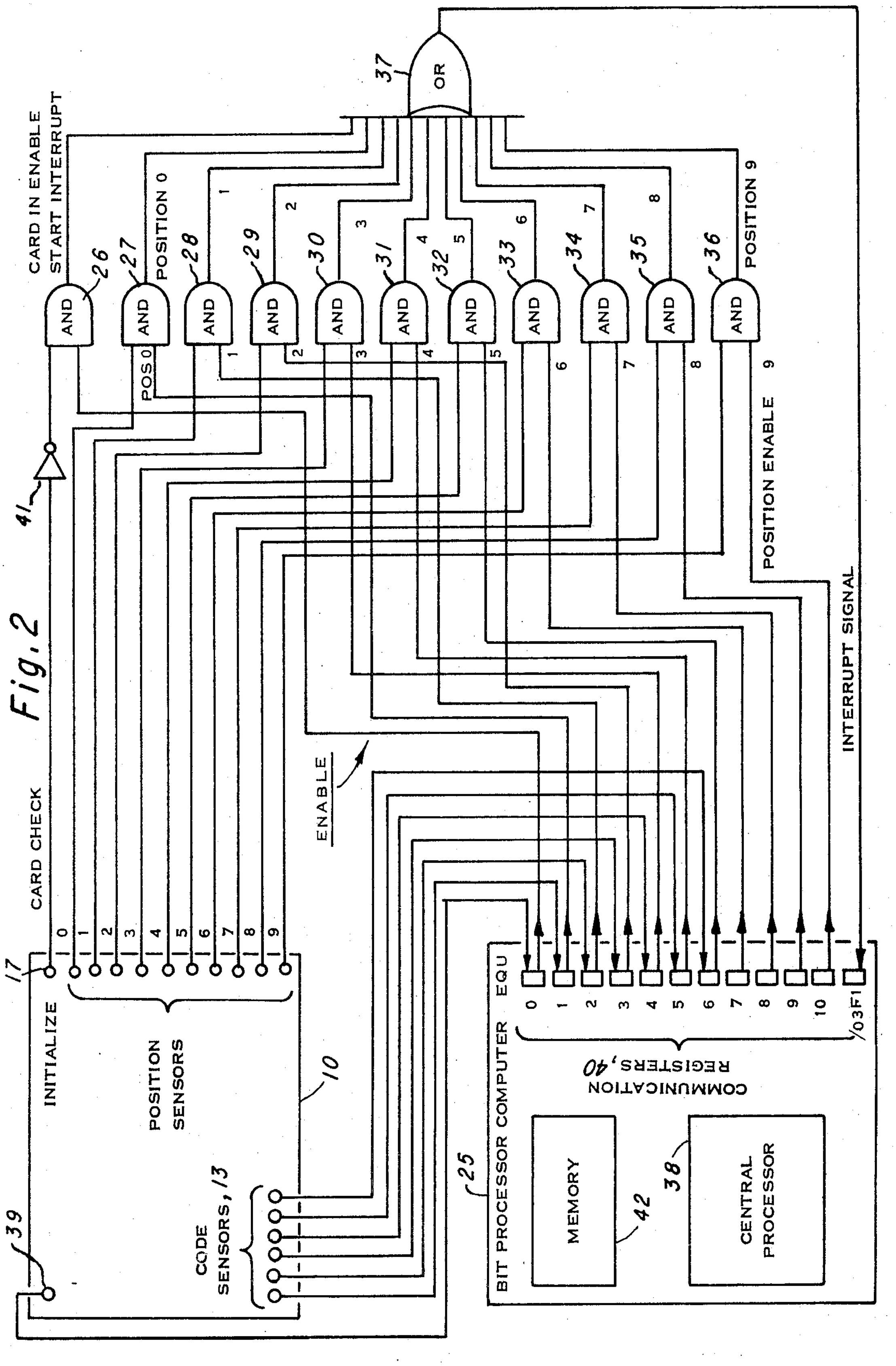
FIG. 2 is a logic diagram of an embodiment of the card reader system of the present invention.

Referring to FIG. 2, the system utilizing the method of the invention is comprised of a digital computer and preferably a bit-processor digital computer 25 programmed in accordance with the method of the invention, the card reader and the external logic gates 26–37. A bit-processor computer is one which is provided with bit processor means for control through input/output channels of external machine processes. One such series of computers are known as the 960 series, manufactured and sold by Texas Instruments Incorporated, Dallas, Texas. Another such computer is known as the 2540M computer, also manufactured by Texas Instruments Incorporated, Dallas, Texas. The bit-processor computers and described in detail in copending patent application Ser. No. 843,614, filed July 22, 1969 by George P. Shuraym, now abandoned, and assigned to the assignee of the present invention. MODE I type programs for the bit-processor computer are described in detail in copending patent application Ser. No. 134,387, filed Apr. 16, 1971 by Claude D. Head III and also assigned to the assignee of the present invention. U.S. patent applications Ser. Nos. 843,614 and 134,387 are hereby incorporated by reference.

Basically, the bit-processor computers are typical of stored program digital computers in that they offer the same features as many other digital computers; that is, arithmetical capability, hardware interrupts to respond to external stimuli, and an instruction set slanted toward computer word operations. In addition, the bit-processor computers include a group of instructions which are slanted toward external machine control. In particular the input and output functions may be bit-oriented rather than word-oriented which is particularly useful because machine-computer interface is more often in terms of bits (representing single wire connections) than in terms of computer words (representing a prescribed number of bits, such as 16). The result of this simplified interface is the segregation of computer-related functions from machine control-related functions in the card reader system of the present invention. Computer 25 includes a memory 42, a central processor unit 38 and communication registers 40 for input to and output from the computer to external equipment.

The operation of a card reader system in accordance with the method of the present invention is best understood with reference to the flow chart of FIG. 3 when read in conjunction with the system illustrated in FIG. 2. The computer 25 is provided with a plurality of flags or registers, one of which has been designated the upside down flag. Initially the upside down flag is equal to O and a logical 1 is provided by the computer through communications register EQU O (the register designated equal to O when referred to in the program) to the card check enable input of AND gate 26, thereby enabling AND gate 26. Then when a coded card 12 is inserted into the card reader and deactivates initialize or card check sensor 17, a logical 1 is provided at the output of AND gate 26. Sensor 17 is in the ON position and generates a logical 1 signal to NOT gate 41 as light from emitter 19 is detected by sensor 17 until a card 12 is inserted which blocks the light. When the card 12 is inserted over sensor 17, sensor 17 is deactivated and provides a logical O signal to NOT gate 41. The output of NOT gate 41 is then a logical 1 when its input from sensor 17 is a logical O and thereby a logical 1 output is provided from AND gate 26 since the card check enable input to AND gate 26 is a logical 1. The output of AND gate 26 is coupled to OR gate 37 which thereby provides a logical 1 interrupt signal to a communications register (/03F1, for example) of computer 25. The interrupt signal to the communications register /03F1 of computer 25 initiates a first pass through the program for which the flow chart is illustrated in FIG. 3 and a corresponding program listing follows as Table I.

TABLE I

```
11 JOB     X  X    X
// XEQ MASM     FX
at ASM SUPR READG
 SY SGTAB,ST,CA,LI,CR,PR
           HDNG   LEVEL 1 CARD READER
             INTERRUPT SERVICE
           MODE   1
           ENT    READG
*
READG      DC       *-*
*
* SAVE REGISTERS
*
           STH    ACC,BR100+1
           STH    1,BR110+1
           STH    2,BR120+1
           STH    EXT,BR130+1
           STOR   CRB,SVCRB
           STOR   MDB,SVMDB
*
           LOAD CRB,CARD
           LOAD MDB,BREDA
*
           OUTPF LEVLS(11), ZERO          INHIBIT READER
                                            INTERRUPTS
*
*
BR005      LH      ACC,USDFG              SEE IF CARD WAS
                                            UPSIDE DOWN
           BZ      BR010
           STH     =0,USDFG               RESET UPSIDE
                                            DOWN FLAG
           TURN    LEVLS(ON)              ENABLE START
                                            INTERRUPT
           B       BR100                  GO EXIT
*
BR010      LH      ACC,LEVEL              CHECK ON LEVEL
                                            IN USE
           BNZ     BR030                  GO READ DATA IF
                                            NOT STARTING
*
```

```
* THIS SECTION DEALS WITH READ
  START UP
*
        SENSE USDPC(OFF)        SEE IF CARD IS
                                  UPSIDE DOWN
        B       BR020           BRANCH IF OK
        TURN    LEVL9(ON)       ENABLE LEVEL 9
                                  PC
        STH     =1,USDFG        SET UPSIDE DOWN
                                  FLAG
        B       BR100           GO EXIT
*
BRO20   TURN    LEVLO(ON)       ENABLE LEVEL O
                                  PC
        STH     =1,LEVEL        SET LEVEL TO
                                  ONE
        B       BR100           GO EXIT
*
* THIS SECTION DEALS WITH NORMAL
  DATA SENSING
*
BR030   AMH     =1,POINT
        LOAD    MDB,POINT
        INPF    PC105(6),BRMSG
        AMH     =1,LEVEL
        LH      ACC,LEVEL
        SH      ACC,=11
        BZ      BR060
        LH      ACC,LEVEL
        OH      ACC,ONBIT
        STH     ACC,*+3
        TURN    *-*(ON)
        B       BR100           GO EXIT
*
* FINISHED WITH CARD READING
* CHECK FOR ERRORS AND CONVERT
  TO BINARY
*
*
BRO60   BSI     CHECK
        STH     ACC,VALU2       SAVE LOW ORDER
                                  HALF OF
                                  NUMBER
*
        LH      1,=10           SHIFT DATA TO
                                  CHECK HIGH
                                  ORDER
BR070   LH      ACC,BRDAT,X(1)  HALF OF WORD
        SRLH    7,3
        STH
        SH      1,=1
        BP      BR070
*
        BSI     CHECK
        STH     ACC,VALU1       SAVE HIGH ORDER
                                  HALF OF
                                  NUMBER
        B       BR095           EXIT
*THIS SECTION DEALS WITH CHECKING
  THE
*DATA READ FROM THE CARD FOR
  ERRORS
*THERE MUST BE ONE AND ONLY ONE
  BIT IN
*EACH COLUMN. THREE COLUMNS ARE
  PROCESSED AT EACH CALL.
*THE DATA IS CONVERTED TO BINARY
  AND RETURNED
*THROUGH REGISTER 7 IS THERE IS NO
  ERROR
*
CHECK   DC      ** *-* RETURN ADDRESS HERE
        LH      1,=3            INITIALIZE
                                  COLUMN
                                  COUNTER
        STH     = O,VALUE
CK010   STH     = COUNT
        LH      2,=10           INITIALIZE ROW
                                  COUNTER
        LH      ACC,MASK,X(1)
        STH     ACC,CK030+1
CK020   LH      ACC,BRDAT,X(2)
CK030   LH      ACC,=*-*,C(ACC)
        BZ      CK040
*CONVERT TO BINARY
*FOUND BIT - INCREMENT BIT COUNT
*CONVERT TO BINARY
*
        AMH     =1,COUNT
*
        LH      ACC,=O
        LH      EXT,DATAB,X(2)
        MH      ACC,MULT,X(1)
        AMH     EXT,VALUE
*
```

```
CK040   SH      2,=1            DECREMENT ROW
                                  COUNTER
        BP      CK020           GO CHECK NEXT
                                  ROW
*
*NOW CHECK FOR ERROR IN THIS
  COLUMN
*
        LH      ACC,COUNT
        SH      ACC,=1
        BNZ     CK050           ERROR IF NOT
                                  ZERO
        SH      1,=1            DECREMENT
                                  COLUMN
                                  COUNTER
        BP      CK010           GO CHECK NEXT
                                  COLUMN
*
*ALL FINISHED - NO ERRORS
*PUT VALUE IN ACC AND RETURN
*
        LH      ACC,VALUE
        B       CHECK,*
*
*ERROR IF WE COME HERE
*
CK050   B       BR095
*
*CONSTANT - DATA - ETC
*
COUNT   DC      *-*
VALUE   DC      *-*
DATAB   EQU     *-1
        DC      0
        DC      1
        DC      2
        DC      3
        DC      4
        DC      5
        DC      6
        DC      7
        DC      8
        DC      9
MULT    EQU     *-1
        DC      1
        DC      10
        DC      100
MASK    EQU     *-1
        DC      1
        DC      2
        DC      4
BR095   STH     =0,LEVEL        RESET LEVEL
        TURN    LEVLS(ON)       ENABLE START
                                  INTERRUPT
        LH      ACC,BREDA       RESET POINT
STH     ACC,POINT
*
*NOW RESTORE REGISTERS AND
  RETURN
*
BR100   LH      ACC,=*-*
BR110   LH      1,=*-*
BR120   LH      2,=*-*
BR130   LH      EXT,=*-*
        LOAD    CRB,SVCRB
        LOAD    MDB,SVMDB
        B       READG,*
*
*CONSTANTS - DATA ARRAYS - ETC
*
LEVLS   EQU     0
USDPC   EQU     0
PC105   EQU     1
LEVLO   EQU     1
ZERO    EQU     2
BRMSG   EQU     2
LEVL9   EQU     10
CARD    DC      /02E0
VALU1   DC      0
VALU2   DC      0
SVCRB   DC      *-*
SVMDB   DC      *-*
LEVEL   DC      *-*
USDFG   DC      *-*
BREDA   DC      *
        BSS     10
BRDAT   DC      0               CONSTANT ZERO
        BSS     10
*
        END
// END
```

On entry 100 into the program, a check 101 of the upside down flag in the computer is made to determine whether the flag is set to a logical 1. Since the flag is initially equal to a logical 0 the program branches to step 104 to determine whether the program is in the middle of reading a card or is starting to read a card. This is determined by checking to see which of AND gates 26–36 the computer is applying an enable signal to via its communication registers 40. Since AND gate 26 is being enabled, indicating that a card has been inserted in the card reader, the computer determines that it is starting and branches to step 105. During step 105 a check is made to determine whether or not the card is upside down. In the system embodied in FIG. 2, this is accomplished, for example, by providing the card 12 with a notch or hole (as shown, for example, in the card) and checking the status of sensor 39 through communications register EQU 0 to determine whether or not the card or the notch or hole is positioned as to activate the sensor 39.

When it is determined during step 105 that a card is upside down, the program branches to step 107, sets the upside down flag to a logical 1, provides a logical 1 through communications register EQU 10 to the enable input of AND gate 36 to enable position sensor number 9 and then branches to exit at step 112. As the card 12 is withdrawn from the card reader and passes over the position sensor number 9, position sensor number 9 is activated and provides a logical 1 signal to the sensor input of AND gate 36. Since both inputs of AND gate 36 are now equal to a logical 1, a logical 1 output is provided from AND gate 36 which is coupled to OR gate 37 thereby providing a logical 1 interrupt signal to the communications register /03F1 of computer 25 which initializes another pass through the program. This time, upon entry 100 the upside down flag is checked during step 101 and now equals a logical 1. Thus it is determined that on the last pass through the program the upside down flag was set and the program branches to step 102 where the upside down flag is reset to a logical 0. Then, during step 103 a logical 1 is again provided by the computer through communications register EQU 0 to the card check enable input of AND gate 26, thereby enabling AND gate 26. The card reader system is thus reinitialized and is prepared to accept another card. The program then branches to exit at step 112.

When during step 105, on the other hand, a check of the status of sensor 39 indicates that the card is not upside down, the program branches to step 106 at which a logical 1 is provided by the computer through communications register EQU 1 to the enable position zero input of AND gate 27. The program then branches to exit at step 112. A logical 1 signal is provided by the zero position sensor when the card has been withdrawn enough for the position sensor to be activated. In the present embodiment, when the card has been withdrawn enough for the light from the corresponding light emitter to turn the photocell used as the position zero sensor ON the logical 1 signal is provided to AND gate 27. Thus, since the enable position O input of AND gate 27 provided by computer 25 through communications register EQU 1 is equal to a logical 1, when the position zero sensor is activated, AND gate 27 provides a logical O output or OR gate 37 to provide another interrupt signal to the computer through communications register /03F1 of the computer 25 which initiates another pass through the program. The program is entered at step 100 and at step 101 the upside down flag is checked. Since the upside down flag is a logical O the program branches to step 104. At step 104 the level or position enabled is checked and since AND gate 27 rather than AND gate 26 is enabled the computer determines that it is not starting and branches to step 108. During step 108 the numbered zero line of code is read by code sensors 13 and stored in computer memory 42. The memory may be addressed by a counter register in the computer initially set at O indicative of the zero position sensor corresponding to the zero line of code. The, during step 109 the counter register in the computer is incremented so that the next position sensor will be enabled and the next corresponding line of code read. During step 110 a check is made to determine whether all of the lines of code have been read. This is accomplished by comparing the count stored in the counter register and determining whether it is greater than the total number of positions (i.e., whether in the present embodiment the count stored in the counter is greater than 10). If the count is greater than ten then the card reader has finished reading the numbered nine code line and therefore has finished reading the card and the program branches to other routines such as a routine to check the stored code or translate the Hollerith code to binary code, etc. and finally exits at step 112 or exits directly at step 112. If the count in the counter register indicates that the card being read is not finished the program branches to step 111 where the next position sensor according to the count in the counter register is enabled. For example, if the next position sensor to be enabled is the numbered 1 position sensor, as indicated by the count in the counter register, the enable position 1 input of AND gate 28 is provided with a logical 1 by the computer through communications register EQU 1 thereby enabling AND gate 28.

Then, when the card 12 has been withdrawn enough for the light from the corresponding light emitter to turn the photodetector utilized as the position 1 sensor ON, a logical 1 signal is provided to AND gate 28, a logical 1 is provided by AND gate 28 to OR gate 37 and a logical 1 interrupt signal is provided by OR gate 37 to communications register /03F1 of computer 25 which initiates another pass through the program so that the numbered 2 line of code is read from card 12 by sensors 13 as the pass is made through the program in a similar manner to the reading of the 0 line of code as described above.

Thus, as the card is withdrawn and passes over each sensor, an interrupt signal is provided by OR gate 37 to initiate another pass through the program until all code-lines have been read as indicated by the counter register.

Figure 4:
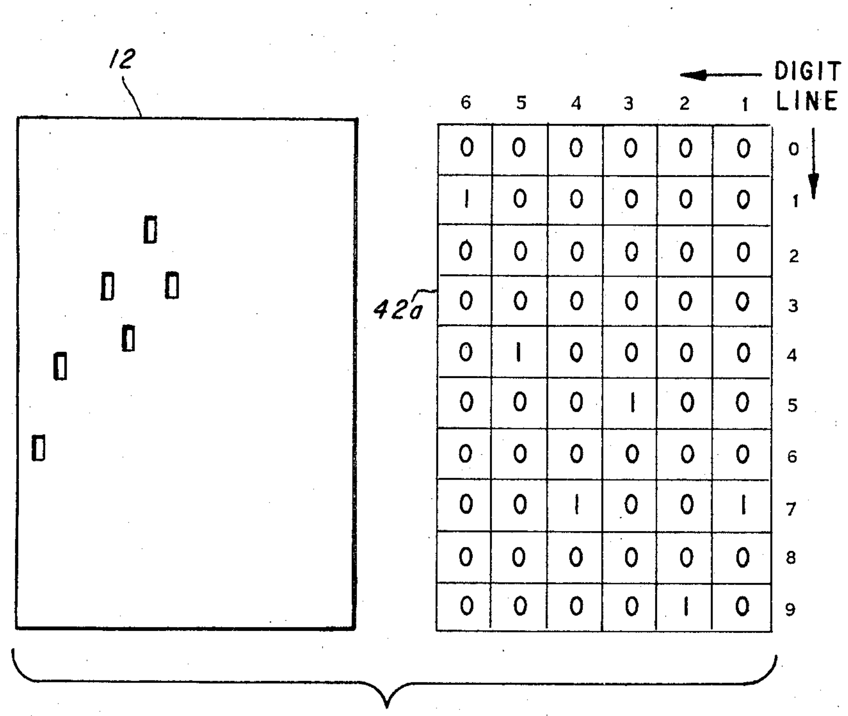
FIG. 4 is a diagram illustrating the code stored in the computer memory for the card 12 of FIG. 1.

After the card 12 of FIG. 1 has been completely inserted and withdrawn from the card reader, the Hollerith code stored in memory 42 of computer 25 is shown in map 42a of FIG. 4. The number recorded on card 12 and stored in memory 42 represents, for example, the number 147597. As stated above, the stored Hollerith coded number may be translated into another coded format such as binary code of binary coded decimal. Program steps for accomplishing the translation of the Hollerith code into binary code are described in Table I.

Figure 6:
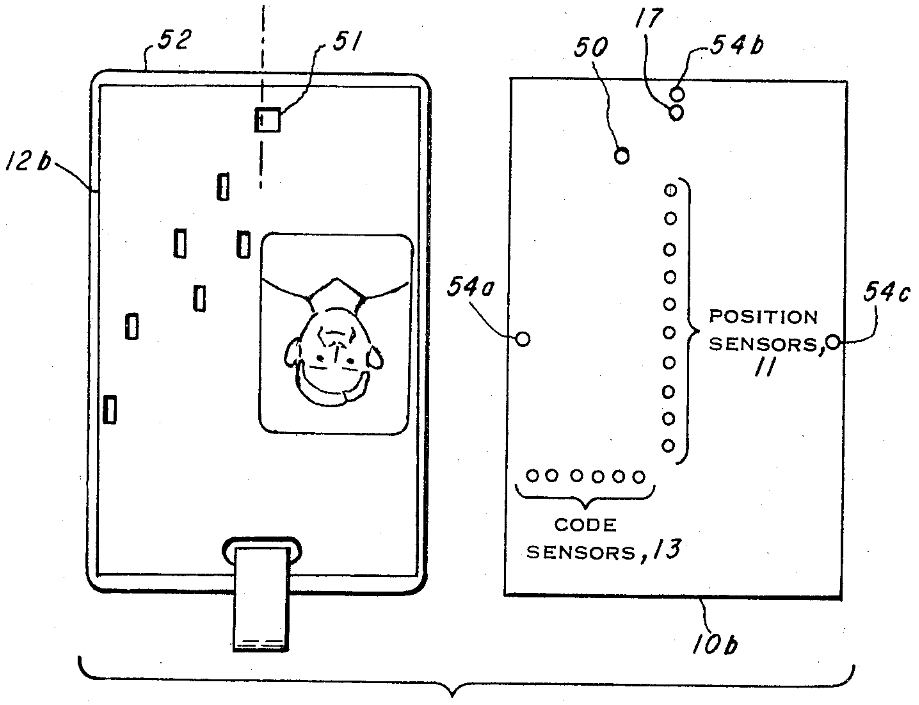
FIG. 5 and 6 are planar views and FIG. 7 is an isometric view of additional cards and card reader sensor combinations according to various other embodiments utilized with the card reader system of the invention.
Figure 5:
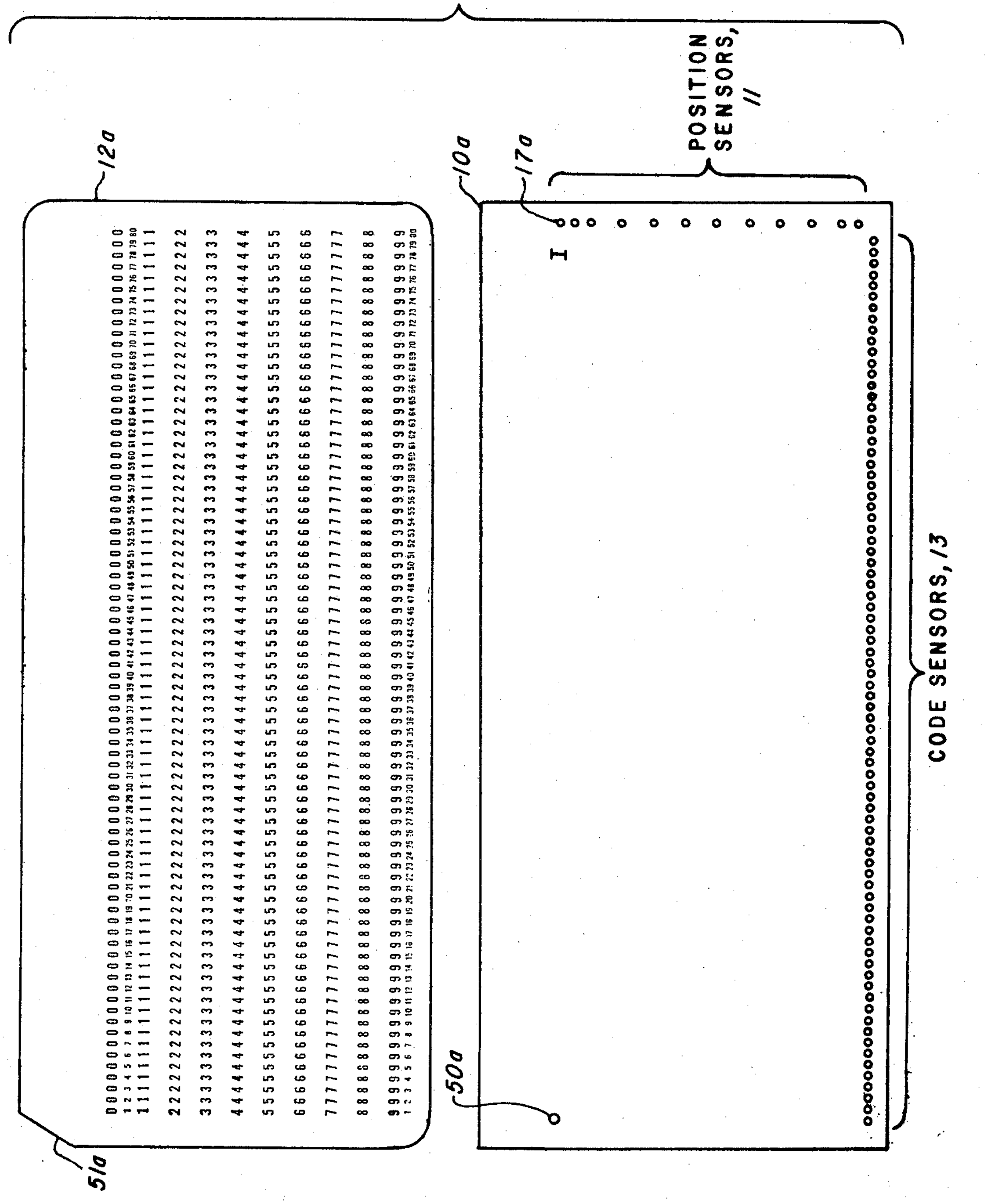

In the embodiment illustrated in FIG, 1, card 12 contains 6 digits of coded information in six rows having 10 code-lines. It should be understood, however, that any number of digits and code-lines may be utilized by increasing or decreasing the number of code sensors and position sensors; and, by respectively increasing or decreasing the number of logic gates and the corresponding designation of communication registers in the computer. Consider, for example, the standard punch code card 12*a* of FIG. 5 and the corresponding sensor arrangement on substrate 10*a*. There are 12 position sensors and 80 code sensors, an initialize sensor 17*a* and an upside down card sensor 50*a*. If card 12*a* is inserted upside down, such that notch 51*a* did not appear over sensor 50*a*, sensor 50*a* is deactivated and a signal is provided indicative of the card being upside down as previously described with respect of the embodiment of FIG. 2. It should also be noted that whereas card 12 in FIG. 1 is shown to be inserted and then withdrawn from the card reader, a card such as card 12*a*, for example, may be inserted and then drawn completely through the card reader for the card to be read. If the card is to be read in that manner, the enabling of the position sensors 11 is sequenced backwards as compared to the sequencing of the position sensors 11 in FIG. 1. The code sensors 13 would then be appropriately placed to read the designated line of code as the bottom edge of the card passes over a respective sensor. In addition, instead of reading all 80 digits simultaneously, one code-line at a time, card 12*a*, for example, may be read such that all code-lines are read simultaneously, one digit line at a time. In order to read the card in this manner the code sensors of FIG. 6 are considered the position sensors which are then sequentially enabled by the programmed computer and the position sensors are considered the code sensors which read the coded information from the card.

Figure 7:
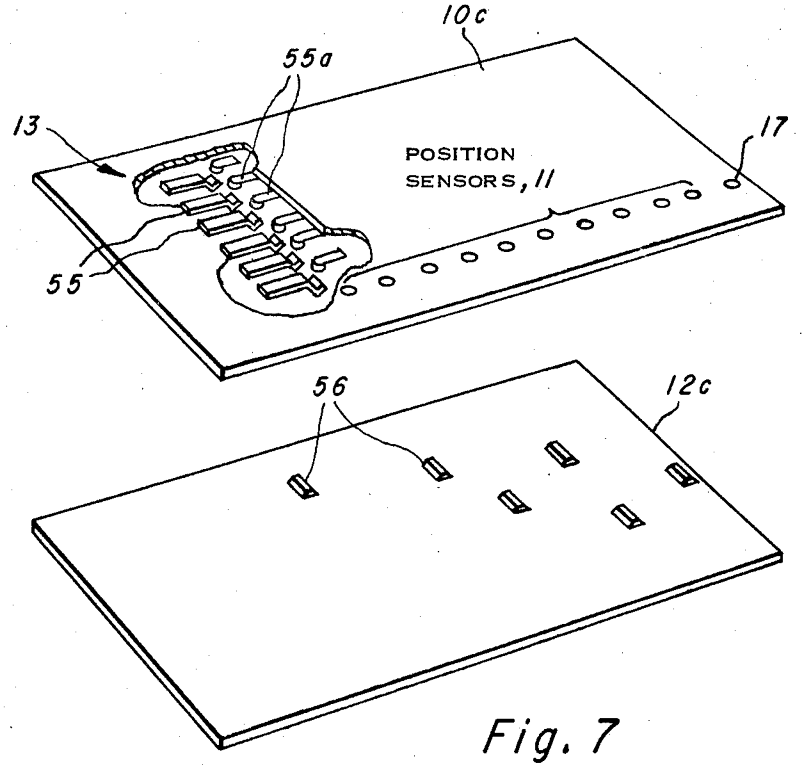

Referring to FIG. 7, a security badge which may be worn from a coat lapel or pocket is illustrated. The badge includes a coded card 12*b* similar to the card 12 which may be laminated in plastic material along with a picture of the holder of such security badge. The card and badge 12*b* include an off-centered opening 51 which is sensed by a corresponding sensor 50 positioned on substrate 10*b* for determining when the badge is inserted into the card reader upside down in cooperation with comparison step 105 of the program. The badge also includes a clear portion 52 of plastic material surrounding the laminated portion of card 12*b*. Sensors 54*a–c* selectively positioned on substrate 10*b* may be utilized to determine whether the badge is a valid badge or just a punched card such as that illustrated in FIG. 1 by sensing the clear portion 52 at various points around the badge, applying the sensor outputs to communication registers of computer 25, providing a comparison step in the program to check the sensors and supply an output signal to the communication registers, etc. if the badge is an illegal badge.

Another type of coded card 12*c* which may be read by the system characterized by the program of the present invention is illustrated in FIG. 8. A credit card 12*c*, for example, may include selectively positioned protruding members 56 corresponding to a code such as a credit card number. In addition to the position sensors 11 which may be photocells or electromechanical switches the sensors 13 for reading information recorded on card 12*c* are shown as electromechanical switches comprised of a plurality of movable contacts 55, for example, which selectively make electrical contact with contacts 55*a* in accordance with the mechanical action provided by the protruding members 56 on card 12*c*. This embodiment of the card reader system is particularly useful in credit card validator systems in which the computer 25 may additionally be programmed to make a credit check on the card holder corresponding to the card number.

Various embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention, will, without departing from the spirit and scope of the invention, be apparent to persons skilled in the art.

What is claimed is:

1. In a method of operating a digital computer to control the operation of a system for reading coded information recorded on cards and the like comprised of a plurality of position sensors, a plurality of code sensors, a plurality of logic gates coupled to the position sensors for enabling the position sensors and for generating interrupt signals to the computer when the cards are moved into predetermined positions with respect to enabled position sensors, the steps of:

a. generating a signal to a selected one of said logic gates to enable a respective position sensor;

b. storing the information sensed by said code sensors in response to an interrupt signal to the computer provided by said logic gates when the cards are moved into said predetermined position with respect to said respective enabled position sensor; and c. generating a signal to a next selected one of said logic gates to enable a next respective position sensor.

2. In the method according to claim 1, the repeating of steps (b) and (c) until each of said position sensors have been enabled as the cards are moved into said predetermined position with respect to each enabled position sensor whereby the information recorded on the cards is stored in the computer.

3. In the method of claim 2 wherein the coded information recorded on the cards in hollerith form, the additional step of translating the Hollerith coded information to binary coded information after all of the information recorded on a card has stored in the computer.

4. In a method of operating a digital computer to control the operation of a system for reading coded information recorded on cards and the like comprised of an initialize sensor, a plurality of position sensors, a plurality of code sensors, a plurality of logic gates coupled to the initialize sensor and the position sensors for enabling the initialize sensor and position sensors and for generating interrupt signals to the computer when the cards are moved into predetermined positions with respect to enabled initialize and position sensors, the steps of:

a. generating a signal to a selected one of said logic gates to enable the initialize sensor;

b. generating a signal to a selected one of said logic gates in response to an interrupt signal to the computer provided by said logic gates when the cards are moved into said predetermined position with respect to said initialize sensor thereby enabling a respective position sensor;

c. storing the information sensed by said code sensors in response to an interrupt signal to the computer provided by said logic gates when the cards are moved into said predetermined position with respect to said respective enabled position sensor; and d. generating a signal to a next selected one of said logic gates to enable a next respective position sensor.

5. In the method according to claim 4, the repeating of steps (c) and (d) until each of said position sensors have been enabled as the cards are moved into said predetermined position with respect to each enabled position sensor whereby the information recorded on the cards is stored in the computer.

6. In the method of claim 5 wherein the coded information recorded on the cards is in Hollerith form, the additional step of translating the Hollerith coded information to binary coded information after all of the information recorded on a card has been stored in the computer.

7. In a method of operating a digital computer to control the operation of a system for reading coded information recorded on cards and the like comprised of an initialize sensor, an upside down sensor, a plurality of position sensors, a plurality of code sensors, a plurality of logic gates coupled to the initialize sensor and to the position sensors for enabling the initialize and position sensors and for generating interrupt signals to the computer when the cards are moved into predetermined positions with respect to enabled initialize and position sensors, the steps of:

a. generating a signal to a selected one of said logic gates to enable the initialize sensor;

b. generating a signal to another selected one of said logic gates in response to an interrupt signal to the computer provided by said one selected logic gate when the cards are moved into said predetermined position with respect to said initialize sensor;

c. checking the status of said upside down sensor, to determine whether the cards are upside down;

d. generating a signal to another selected one of said logic gates when said upside down sensor indicates that the cards are not upside down to enable a respective position sensor;

e. storing the information sensed by said code sensors in response to an interrupt signal to the computer provided by said logic gates when the cards are moved into said predetermined position with respect to said enabled respective position sensor; and thereafter f. generating a signal to a next selected one of said logic gates to enable a next respective position sensor.

8. In the method according to claim 7, the repeating of steps (e) and (f) until each of said position sensors have been enabled and the cards are moved into said predetermined position with respect to each enabled position sensor whereby the information recorded on the cards is stored in the computer.

9. In the method according to claim 7, the additional steps of:

a. setting a register in the computer to an upside down state when said upside down sensor indicates that cards are upside down; and thereafter b. generating a signal to a last selected one of said logic gates to enable a last respective position sensor;

c. checking the state of said register to determine whether it is set to the upside down state in response to an interrupt signal provided by said logic gates when the upside down cards are moved into said predetermined position with respect to said enabled last respective position sensor;

d. resetting said register to a card not upside down state; and e. generating a signal to said selected one of said logic gates to enable the initialize sensor.

10. In a method of operating a digital computer to control the operation of a system for reading coded information recorded on cards and the like comprisable plurality of positioned sensors, a plurality of code sensors, and plurality of logic gates coupled to the position sensors for enabling the position sensors and for generating interrupt signals to the computer when the cards are moved into predetermined position with respect to enabled position sensors, the steps of:

a. generating a signal to a selected one of said logic gates to enable a respective position sensor;

b. storing the information sensed by said code sensors in response to interrupt signal to the computer provided by said logic gates when the cards are moved into said predetermined position with respect to said respective enabled positioned sensor;

c. incrementing a counter register in the computer; and d. generating a signal to a next one of said logic gates selected in accordance with the count of said counter register to enable a next respective position sensor.

11. In the method according to claim 10, the repeating of steps (b)–(d) until each of said position sensors have been sequentially enabled as the cards are moved into said predetermined position with respect to each enabled position sensor whereby the information recorded on the cards is stored in the computer.

12. In the method according to claim 11, the storing of the information recorded on the cards sequentially in accordance with the count of said counter register.

13. In a method of operating a digital computer to control the operation of a system for reading coded information recorded on cards and the like comprised of an initialized sensor, a plurality of positioned sensors, a plurality of code sensors, a plurality of logic gates coupled to initialized sensor and the position sensors for enabling the initialized sensor and position sensors and for generating interrupt signals to the computer when the cards are moved into predetermined positions with respect to enabled initialized and position sensors, the steps of:

a. generating a signal to a selected one of said logic gates to enable the initialize sensors;
b. generating a signal to a selective one of said logic gates in response to an interrupt signal to the computer provided by said logic gates when the cards are moved into said predetermined position with respect to said initialize sensor thereby enabling a respective position sensor;
c. storing the information sensed by said code sensors in response an interrupt signal to the computer provided by said logic gates when the cards are moved into said predetermined position with respect to said respective enabled position sensor;
d. incrementing a counter register in the computer;
e. generating a signal to a next one of said logic gates selected in accordance with the count of said counter register to enable a next respective position sensor, and
f. repeating steps (c)–(e) until each of said position sensors have been sequentially enabled in accordance with the incremented count of said counter register as the cards are moved into said predetermined position with respect to each enabled position sensor whereby the information recorded on the cards is stored in the computer.

14. In the method according to claim 13, the step of checking said counter register to determine whether all of the information recorded on the cards has been stored in the computer each time that the counter is incremented.

15. In the method of claim 14, wherein the coded information recorded on the cards is in hollerith form, the additional step of translating the Hollerith coded information to binary coded information after all of the information recorded on a card has been stored in the computer as determined by the count in said counter register.

16. In the method of claim 13, the reading of the coded information recorded on the cards by said code sensors wherein a plurality of digits in Hollerith form are read simultaneously one-code-line at a time.

* * * * *